is not in print
PATENTED MAY 21, 1805.
T. W. PRYOR.
BARK MILL.
621X
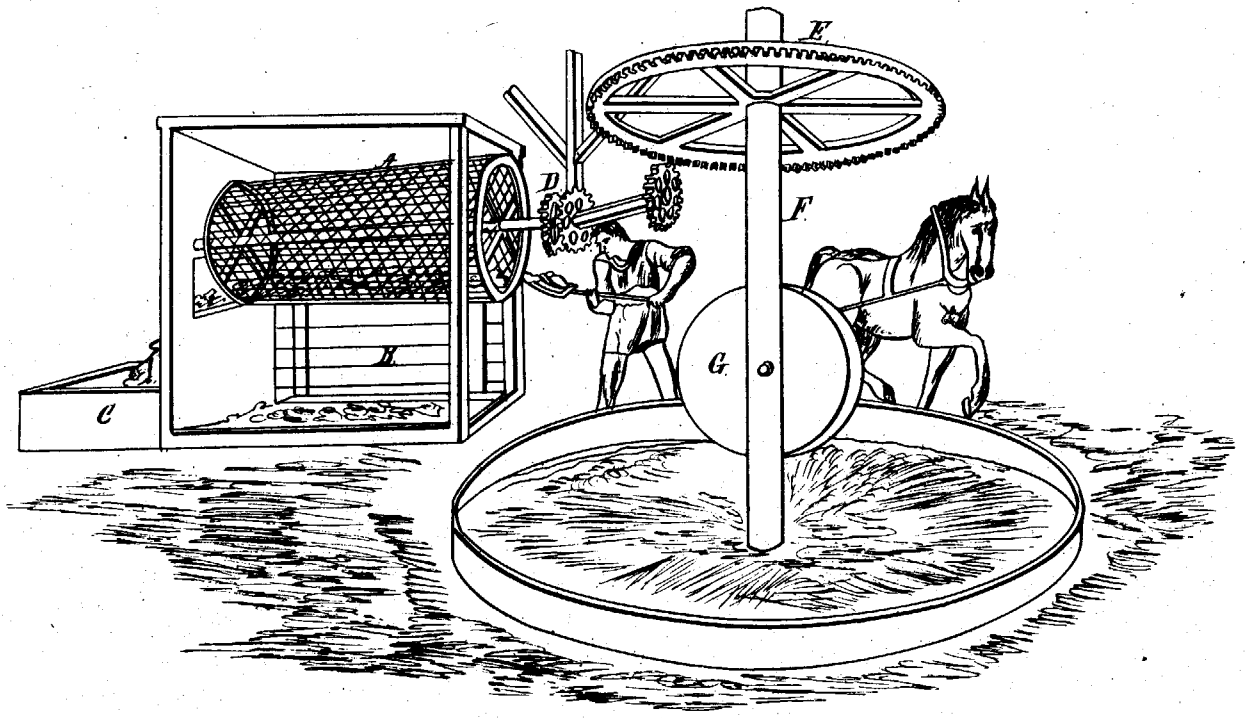
THE NORRIS PETERS CO., PHOTO-LITHO., WASHINGTON, D. C.

May 21 1805

621X

Thomas W. Pryor a Citizen of Pennsylvania.

Letters Patent.

The Schedule referred to in these Letters Patent, and making part of the same, containing a description in the words of the said Thomas W. Pryor himself of his Improvement in the Bark Mill.

Bark, after being prepared in the usual manner is thrown into a "Horizontal Separating Machine": which is a Cylindrical Revolutionary Wire" [Sieve]" finer or coarser as may be found most advantageous, with Interstices to produce long or short filaments of Bark, according to the different Interstices wh may be in the wire work: the separated Bark falls into a Chest below the "Separating Machine, throwing out at the end the unmashed lumps or pieces "of Bark which may not be sufficiently ground, which falling into a Reservoir are from thence taken and placed in a Common Bark Mill and after being re-ground is thrown into the Separating Machine, & goes through the foregoing process.

Thomas W. Pryor

Exa [illegible]

Witnesses
Anthony Morris
Fred[k] Wolbert 170 words (Patented 21 May 1805)